United States Patent
Kandibanda et al.

(10) Patent No.: US 11,114,697 B2
(45) Date of Patent: Sep. 7, 2021

(54) CONFIGURATIONS FOR BATTERY CELL PACKAGING

(71) Applicant: Apple Inc., Cupertino, CA (US)

(72) Inventors: Rajesh Kandibanda, San Jose, CA (US); Jason Zhao, Suisun City, CA (US); Salvatore Casadonte, Acton, MA (US); Mark Wilcox, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 16/222,179

(22) Filed: Dec. 17, 2018

(65) Prior Publication Data

US 2020/0075992 A1 Mar. 5, 2020

Related U.S. Application Data (60) Provisional application No. 62/726,566, filed on Sep. 4, 2018.

(51) Int. Cl.
*H01M 10/058* (2010.01)
*H01M 10/0525* (2010.01)
(Continued)

(52) U.S. Cl.
CPC ..... *H01M 10/058* (2013.01); *H01M 10/0525* (2013.01); *H01M 50/183* (2021.01); *H01M 50/531* (2021.01)

(58) Field of Classification Search
CPC ........... H01M 10/0525; H01M 10/058; H01M 2002/0205; H01M 2220/30;
(Continued)

(56) References Cited

U.S. PATENT DOCUMENTS

| 2005/0084749 A1* | 4/2005 | Hwang | H01M 2/08 |
| | | | 429/127 |
| 2017/0092923 A1* | 3/2017 | Pasma | H01M 2/025 |
| 2019/0259979 A1* | 8/2019 | Ryu | H01M 2/0207 |

FOREIGN PATENT DOCUMENTS

| EP | 2634831 A1 | 9/2013 |
| EP | 3340358 A1 | 6/2018 |

(Continued)

OTHER PUBLICATIONS

"International Search Report and Written Opinion," dated Jan. 14, 2020, in PCT Application No. PCT/US2019/047818. 18 pages.

(Continued)

*Primary Examiner* — Adam A Arciero
(74) *Attorney, Agent, or Firm* — Kilpatrick Townsend & Stockton LLP (57) ABSTRACT

Batteries according to embodiments of the present technology may include a battery cell having a longitudinal body section and a lateral body section extending from and normal to the longitudinal body section. An intersection of the longitudinal body section and the lateral body section may define an interior corner. The battery may also include a pouch extending about the battery cell. The pouch may define a seal where a first section of the pouch is sealed to a second section of the pouch externally to the battery cell about a plurality of sides of the battery cell including at the interior corner. The seal may be folded against the pouch and coupled with the pouch along multiple sides of the battery cell.

18 Claims, 6 Drawing Sheets

(51) Int. Cl.
*H01M 50/183* (2021.01)
*H01M 50/531* (2021.01)

(58) Field of Classification Search
CPC .. H01M 2/0202; H01M 2/021; H01M 2/0275; H01M 2/08; H01M 2/26; Y02E 60/10
See application file for complete search history.

(56) References Cited

FOREIGN PATENT DOCUMENTS

KR       20190043251 A     4/2019
WO    WO-2017095002 A1 *  6/2017  ............ H01M 10/04

OTHER PUBLICATIONS

PCT/US2019/047818, "Invitation to Pay Additional Fees and, Where Applicable, Protest Fee", dated Nov. 14, 2019, 13 pages.

* cited by examiner

CONFIGURATIONS FOR BATTERY CELL PACKAGING

CROSS-REFERENCES TO RELATED APPLICATIONS

This application claims the benefit of priority under 35 U.S.C. § 119(e) to U.S. Provisional Application No. 62/726,566, filed Sep. 4, 2018, and which is hereby incorporated by reference in its entirety for all purposes.

TECHNICAL FIELD

The present technology relates to battery systems. More specifically, the present technology relates to battery cell configurations and associated packaging.

BACKGROUND

Batteries are used in many devices. As devices in which batteries are housed reduce in size, the available space for battery cells and associated system materials may limit placement and packing options.

SUMMARY

Batteries according to embodiments of the present technology may include a battery cell having a longitudinal body section and a lateral body section extending from and normal to the longitudinal body section. An intersection of the longitudinal body section and the lateral body section may define an interior corner. The battery may also include a pouch extending about the battery cell. The pouch may define a seal where a first section of the pouch is sealed to a second section of the pouch externally to the battery cell about a plurality of sides of the battery cell including at the interior corner. The seal may be folded against the pouch and coupled with the pouch along multiple sides of the battery cell.

In some embodiments, the batteries may include electrode tabs extending from an edge of the lateral body section of the battery cell. The electrode tabs may extend through the pouch. The battery cell may define the interior corner as an arcuate shape recessed from a planar intersection of a sidewall of the lateral body section and a sidewall of the longitudinal body section. The pouch may be folded about the battery cell along a longitudinal side of the battery cell, and the pouch may be sealed along the remaining sides of the battery cell. The batteries may also include tape disposed along and folded over an exterior edge of the seal along each side of the plurality of sides of the battery cell along which the seal is formed. The tape may include a separate piece of tape for each side of the plurality of sides of the battery cell along which the seal is formed. Each outer corner of the seal may include a chamfered edge, and each piece of tape may include an extension coupled along an adjacent chamfered edge.

At the interior corner of the battery, a notch may be defined in the seal. Each piece of tape extending along the seal towards the interior corner may include an extension that couples about a side of the notch. A first corner tape piece may be positioned on one side of the seal at the interior corner, and a second corner tape piece may be positioned on an opposite side of the seal as the first corner tape piece. Each of the first corner tape piece and the second corner tape piece may be characterized by a shape profile matching a profile of the interior corner. Each of the first corner tape piece and the second corner tape piece may include a leg extending from an edge of the tape piece opposite an edge adjacent the interior corner. The leg of the first corner tape piece may at least partially couple directly to the leg of the second corner tape piece. An adhesive may be positioned on the tape proximate an exterior edge of the seal. The adhesive may couple a material side of the tape with the pouch where the seal is folded against the pouch. The tape may include a material layer and an adhesive layer. The adhesive layer of the tape may be maintained in contact with the seal of the pouch without extending to a portion of the pouch in contact with the battery cell.

Some embodiments of the present technology may also encompass batteries, which may include a battery cell characterized by an L-shaped body defining an interior corner. The batteries may include a pouch folded about the battery cell along a length of the battery cell. The pouch may define a seal where a first section of the pouch is sealed to a second section of the pouch externally to the battery cell about each side of the battery cell but the length along which the pouch is folded. The batteries may include tape positioned along a first surface of the seal and extending about an outer edge of the seal to a second surface of the seal opposite the first surface. The batteries may also include adhesive disposed on an exterior surface of the tape along a portion of the tape positioned on the second surface of the seal. The adhesive may couple the tape and seal with a section of the pouch contacting the battery cell.

In some embodiments, the seal in the coupled position with the pouch may extend less than 1 mm from an outer edge of the battery cell. At the interior corner of the battery cell, a notch may be defined in the seal. The tape may include an angled extension that is positioned on the seal along a side of the notch. A first corner tape piece may be positioned on one side of the seal at the interior corner. A second corner tape piece may be positioned on an opposite side of the seal as the first corner tape piece. The battery cell may define the interior corner as an arcuate shape recessed from a planar intersection of perpendicular sidewalls of the L-shaped body at the interior corner. The first corner tape piece and the second corner tape piece may each be characterized by a semicircle section of tape disposed on the seal at the interior corner. The first corner tape piece and the second corner tape piece may further include a leg extending from the semicircle section of tape. The leg of the first corner tape piece may at least partially be coupled directly to the leg of the second corner tape piece.

Some embodiments of the present technology may also encompass batteries. The batteries may include a battery cell including a longitudinal body section and a lateral body section extending from and normal to the longitudinal body section. An intersection of the longitudinal body section and the lateral body section may define an interior corner. The battery cell may define the interior corner as an arcuate shape recessed from a planar intersection of a sidewall of the lateral body section and a sidewall of the longitudinal body section. The batteries may include a pouch extending about the battery cell. The pouch may define a seal where a first section of the pouch is sealed to a second section of the pouch externally to the battery cell about a plurality of sides of the battery cell including at the interior corner. The seal may be folded against the pouch and coupled with the pouch along multiple sides of the battery cell. The batteries may also include tape positioned along a first surface of the seal and extending about an outer edge of the seal to a second surface of the seal opposite the first surface. The seal in the coupled position with the pouch may extend less than 1 mm from an outer edge of the battery cell.

Such technology may provide numerous benefits over conventional technology. For example, the present devices may accommodate non-rectangular form factors. Additionally, packing designs according to some embodiments may include more space efficient configurations affording additional volume for battery cell components. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cell may be designed with a balance of characteristics in mind. For example, including larger battery cells in a device may provide increased usage between charges, however, the larger batteries may require larger housing, or increased space within the device. As device designs and configurations change, especially in efforts to reduce device sizes, the available space for additional device components may be constrained. These constraints may include restrictions in available volume as well as the geometry of such a volume. Conventional devices have often been restricted to larger form factors to accommodate both a sufficient battery cell as well as associated battery system components. The devices also tend to be rectangular, allowing a particular packaging process that may not be amenable to non-rectangular shaped batteries.

The present technology may overcome these issues, however, by providing a configuration by which a battery occupying a multidirectional space may be packaged appropriately for the design. Advantageously, packaging according to some embodiments of the present technology may also reduce space accommodated by packaging, allowing increased battery cells. After illustrating an exemplary cell that may be used in embodiments of the present technology, the present disclosure will describe battery packaging processes and designs having a controlled form factor producing batteries that may be used in a variety of devices that may or may not have space constraints.

Although the remaining portions of the description will routinely reference lithium-ion batteries, it will be readily understood by the skilled artisan that the technology is not so limited. The present techniques may be employed with any number of battery or energy storage devices, including other rechargeable and primary battery types, as well as electrochemical capacitors. Moreover, the present technology may be applicable to batteries and energy storage devices used in any number of technologies that may include, without limitation, phones and mobile devices, watches, glasses, other wearable technology including fitness devices, handheld electronic devices, laptops and other computers, as well as other devices that may benefit from the use of rechargeable battery technology.

Figure 1:
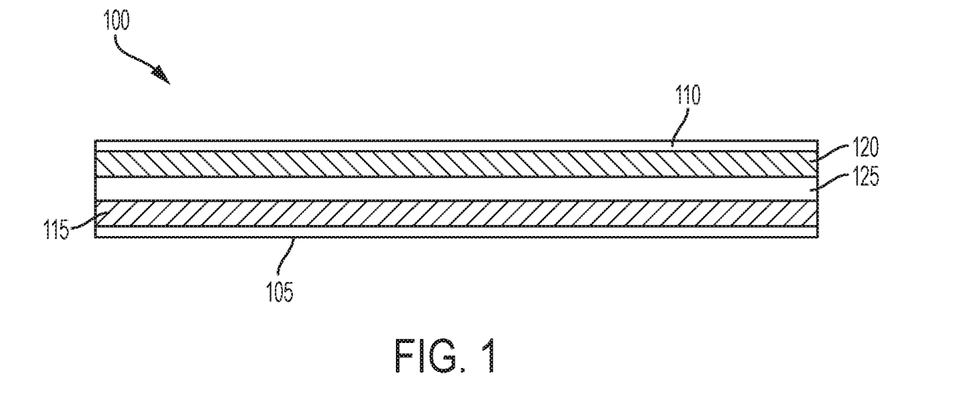
FIG. 1 shows a schematic cross-sectional view of a battery cell according to some embodiments of the present technology.

FIG. 1 depicts a schematic cross-sectional view of an energy storage device 100 according to some embodiments of the present technology. Energy storage device 100 may be or include a battery cell, and may include a number of cells coupled together to form a battery structure. As would be readily understood, the layers are not shown at any particular scale, and are intended merely to show the possible layers of cell material of one or more cells that may be incorporated into the energy storage device 100. In some embodiments, as shown in FIG. 1, battery cell 100 includes a first current collector 105 and a second current collector 110. In embodiments one or both of the current collectors may include a metal or a non-metal material, such as a polymer or composite. The first current collector 105 and second current collector 110 may be different materials in embodiments. For example, in some embodiments the first current collector 105 may be a material selected based on the potential of an anode active material 115, such as copper, stainless steel, or any other suitable metal, as well as a non-metal material including a polymer. The second current collector 110 may be a material selected based on the potential of a cathode active material 120, such as aluminum, stainless steel, or other suitable metals, as well as a non-metal material including a polymer. In other words, the materials for the first and second current collectors can be selected based on electrochemical compatibility with the anode and cathode active materials used.

The first and second current collectors may be made of any material known in the art. For example, copper, aluminum, nickel, or stainless steel may be used, as well as composite materials having metallic aspects, and non-metallic materials including polymers. In some instances the metals or non-metals used in the first and second current collectors may be the same or different. The materials selected for the anode and cathode active materials may be any suitable battery materials operable in rechargeable as well as primary battery designs. For example, the anode active material 115 may be silicon, graphite, carbon, a tin alloy, lithium metal, a lithium-containing material, such as lithium titanium oxide (LTO), or other suitable materials that can form an anode in a battery cell. Additionally, for example, the cathode active material 120 may be a lithium-containing material. In some embodiments, the lithium-containing material may be a lithium metal oxide, such as lithium cobalt oxide, lithium manganese oxide, lithium nickel manganese cobalt oxide, lithium nickel cobalt aluminum oxide, or lithium titanate, while in other embodiments the lithium-containing material can be a lithium iron phosphate, or other suitable materials that can form a cathode in a battery cell.

The first and second current collectors as well as the active materials may have any suitable thickness. A separator 125 may be disposed between the electrodes, and may be a polymer film or a material that may allow lithium ions to pass through the structure while not otherwise conducting electricity. Active materials 115 and 120 may additionally include an amount of electrolyte in a completed cell configuration. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semimetal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities, such as greater than or about 5-10 mS/cm.

Although illustrated as single layers of electrode material, cell material 100 may be any number of layers. Although the cell may be composed of one layer each of anode and cathode material as sheets, the layers may also be formed into a jelly roll design, or folded design, prismatic design, or any form such that any number of layers may be included in cell material 100. For embodiments which include multiple layers, tab portions of each anode current collector may be coupled together, as may be tab portions of each cathode current collector. Once the cell has been formed, a pouch, housing, or enclosure may be formed about the cell to contain electrolyte and other materials within the cell structure, as will be described below. Terminals may extend from the pouch to allow electrical coupling of the cell for use in devices, including an anode and cathode terminal. The coupling may be directly connected with a load that may utilize the power, and in some embodiments the battery cell may be coupled with a control module that may monitor and control charging and discharging of the battery cell. FIG. 1 is included as an exemplary cell that may be incorporated in battery systems according to the present technology. It is to be understood, however, that any number of battery and battery cell designs and materials that may include charging and discharging capabilities similarly may be encompassed by the present technology.

As noted previously, the size of a battery cell defines the amount of power available, and hence the amount of time a device may be used prior to recharging. Battery technology may be improving to provide longer battery life at smaller form factors, however, as devices continue to reduce in size, improved battery cells and packaging design may facilitate extended operation. Additionally, producing other device components to accommodate a rectangular battery may limit the components and their construction. The present technology may produce batteries that may be of a number of form factors, including rectangular, L-shaped, T-shaped, polygonal with central apertures, such as a rectangle having a hole in the middle, which may also be polygonal, as well as a number of other shapes that may be characterized by or include an internal corner as will be discussed below.

Batteries accommodating a greater variety of shapes may increase manufacturing flexibility by allowing adjustments to more components to better fit a given device volume. However, conventional packaging of the battery cell may no longer be suitable depending on the materials used in the cell or packaging. For example, as explained above, a pouch may be fitted about the battery cell to contain electrolyte, limit opportunity for shorting, and provide environmental protection for the battery cell. The pouch may include an insulation layer to perform many of the functions, and the insulation may be or include a polymeric material. However, polymers may typically allow water transmission as water may be capable of passing through the polymer chains. Water within the battery cell may compromise efficient operation, and thus pouch designs may include a barrier to limit water or other fluid transmission. For example, a metal layer may be included in a multilayer pouch. The metal may produce a vapor barrier and provide an amount of rigidity to the packaging. For example, aluminum or other metals or non-polymeric materials may be included as an internal layer in a pouch, including pouches according to some embodiments of the present technology.

When the pouch is sealed, which may include trimming the pouch sides, the internal layer of metal or other barrier material may be exposed along the edge where an overlying polymeric layer may no longer cover. This may provide a path for shorting, and may produce a sharp edge that may contact and damage other internal device components. Some devices protect the exposed edge by producing a double fold on the edge of the battery. The seal may be extended a certain distance to allow the end of the seal to be folded back on itself, and then folded up against the battery cell. This may protect the edge by enclosing the edge within additional material, but such a design may be limited. For example, a double-fold design may be limited to particular form factors that can accommodate multiple folds, and when a battery cell has an internal corner, the corner may not permit a double fold against the corner. Additionally, by producing a double fold, the outer dimensions of the battery cell are increased on each surface where the fold occurs. Although the space lost may not be excessively large, as packaging technology strives to allow the greatest amount of space for a battery cell, this packaging design further limits the size of a battery within a set volume, and may limit the device operational lifetime due to a slightly smaller battery.

Figure 2:
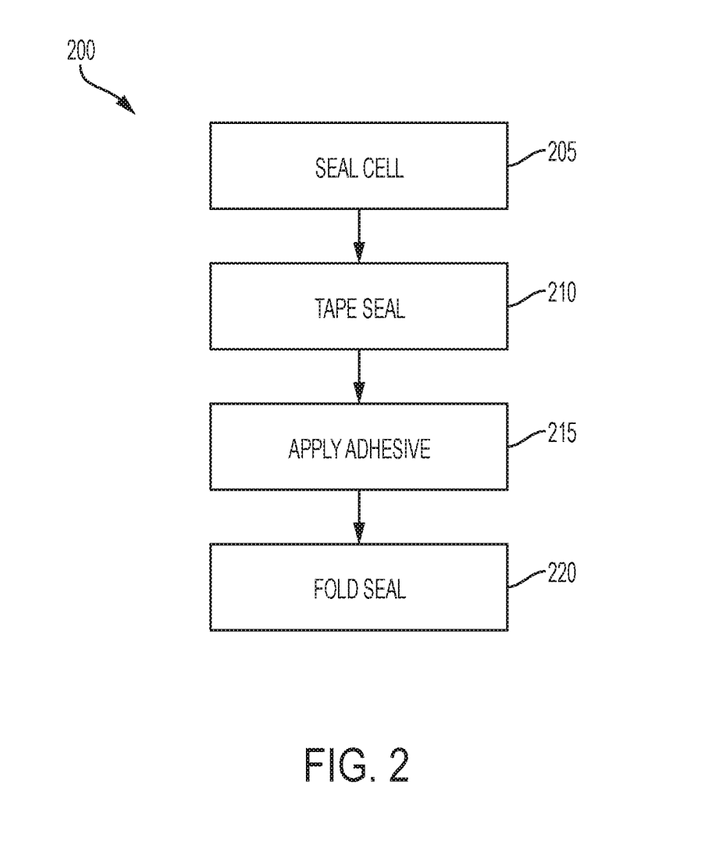
FIG. 2 identifies operations of an exemplary method of packaging a battery according to some embodiments of the present technology.

The present technology may utilize additional packaging elements to perform a single fold on the pouch, while providing sufficient environmental protection for the edge of the pouch seal. By using a single fold, the packaging may accommodate internal corners, and may also provide additional space for battery cell materials, which can increase energy density at a given form factor. FIG. 2 identifies operations of an exemplary method 200 of packaging a battery according to some embodiments of the present technology. The operations may be performed on any of the battery cell materials previously explained, and may utilize a pouch as discussed above. The operations of FIG. 2 are shown schematically in the following figures, which will be referenced with respect to the method operations. Although the figures illustrate an L-shaped battery, it is to be understood that any of the previously noted geometries may be accommodated by embodiments of the present technology, and the technology is not to be considered limited to the specific geometry illustrated.

Figure 3:
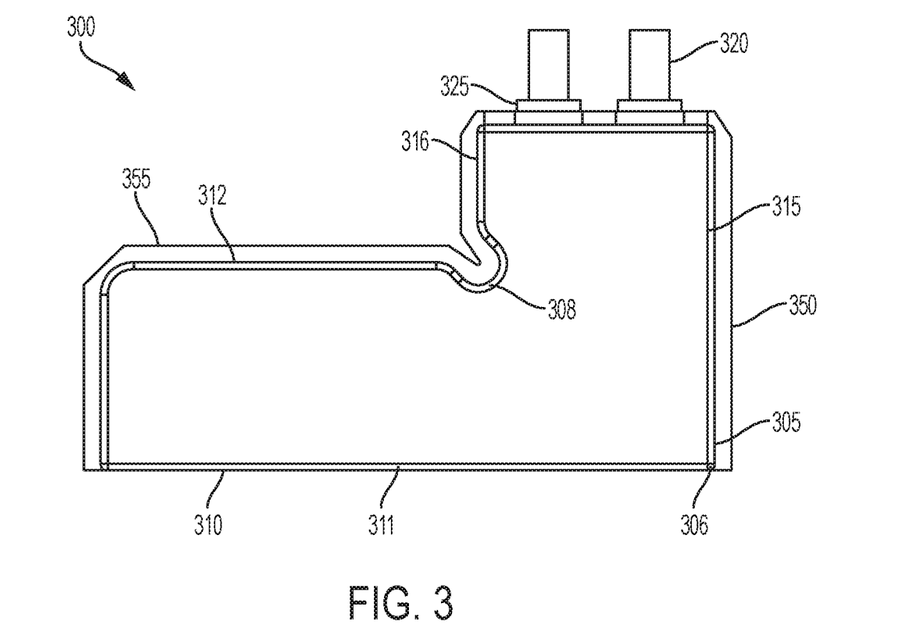
FIG. 3 shows a schematic top plan view of a battery according to some embodiments of the present technology.

Method 200 may include a number of operations performed prior to the method including battery cell fabrication. The battery cell may be produced and formed to the determined shape prior to initiation of method 200. At operation 205, a battery cell may be enclosed in a pouch. The battery cell and pouch may be any of the materials or configurations described above. FIG. 3 shows a schematic top plan view of an exemplary battery 300 according to some embodiments of the present technology. Battery 300 may illustrate an exemplary battery cell after battery cell 305 is enclosed within pouch 350.

Although any number of battery cell configurations may be used, battery 300 may include an L-shaped battery cell as illustrated. In this configuration, the battery cell may include a longitudinal body section 310 and a lateral body section 315. Both sections may extend from a corner of the battery cell 305, and may extend normal to one another, although any angle of extension may be accommodated, which may be greater than or less than ninety degrees. Longitudinal body section 310 may be characterized by a length in a first direction from an exterior corner 306, and lateral body section 315 may be characterized by a length in a second direction perpendicular to the first direction from exterior corner 306. Although shown as extending to different lengths, it is to be understood that the body sections may extend to a similar length or any different lengths in each direction.

Battery cell 305 may also define an interior corner 308, which may resemble a joint, such as a recessed corner of the joint, at which the lateral body section and the longitudinal body section intersect. About the battery cell 305 may be pouch 350 that extends around the battery cell, and which may be sealed about one or more portions of the cell, to produce seal 355. Although the pouch may be or include two separate sheets that are sealed about all edges of the battery cell, in other embodiments as illustrated, the pouch may be folded over the battery cell, and sealed on each side but for the folded side.

For example, pouch 350 may be folded about battery cell 305 along longitudinal side 311. The exposed ends of the pouch may then be sealed about a number of other sides, or all other sides, so that an overlying section of the pouch is sealed with an underlying section of the pouch external to the battery cell. This may also include forming a seal at interior corner 308 as illustrated. Pouch 350 may extend any distance past the edge of the battery cell, and in some embodiments the pouch may be trimmed during, prior to, or subsequent the sealing operation. Additionally, corners of seal 355 may be trimmed to particular shapes, such as the chamfered edges shown, which may facilitate sealing operations, limit sharp corners, or reduce a final footprint of the finished battery. The remaining portion of the seal may be a distance less than a height of the battery cell, as will be explained further below, although any length of material may be maintained. Battery cells according to the present technology may be any size or of any dimensions, although in some embodiments battery cells may be formed of reduced dimensions to accommodate specific form factors of electronic devices, which may include any of the electronic devices described above. Accordingly, in some embodiments the seal may extend from sides of the battery cell less than or about 1 cm, and may extend from sides of the battery cell less than or about 9 mm, less than or about 8 mm, less than or about 7 mm, less than or about 6 mm, less than or about 5 mm, less than or about 4 mm, less than or about 3 mm, less than or about 2 mm, less than or about 1 mm, or less, although in some embodiments the seal may extend at least about 1 mm to provide adequate support for additional materials as will be described further below.

One or more electrode tabs 320 may extend from the battery cell, and may extend through pouch 350. The electrode tabs may extend from any portion of the cell, and in some embodiments the electrode tabs 320 may extend from an outer edge of the lateral body, such as parallel to a direction of the lateral body, although the tabs may extend from any other surface as well. In the illustrated configuration, the electrode tabs may be coupled with a system module, or other component that may control or facilitate discharging and/or charging of the battery cell. Seal 355 may extend about the electrode tabs 320, and an additional sealant 325 may be positioned about the electrode tabs to further limit access to the battery cell, such as for water vapor in the environment or other materials that may contact the battery.

Interior corner 308 may be characterized by any number of shapes, including a straight corner. However, a rigid corner may challenge sealing at the location because the material may not permit folding, and tape or other material may not adequately fold about such a corner. Accordingly, in some embodiments interior corner 308 may be characterized by a different shape. Any number of alternative shapes may be used, including a curved corner as illustrated. For example, the battery cell may define the interior corner as recessed from what would be a rigid corner along the adjacent sidewalls, were lateral side 316 and longitudinal side 312 extended directly together to produce the interior corner. As illustrated, battery cell 305 defines the interior corner as an arcuate shape recessed from the planar intersection along longitudinal side 312 and lateral side 316. This may facilitate additional operations discussed below.

Figure 4:
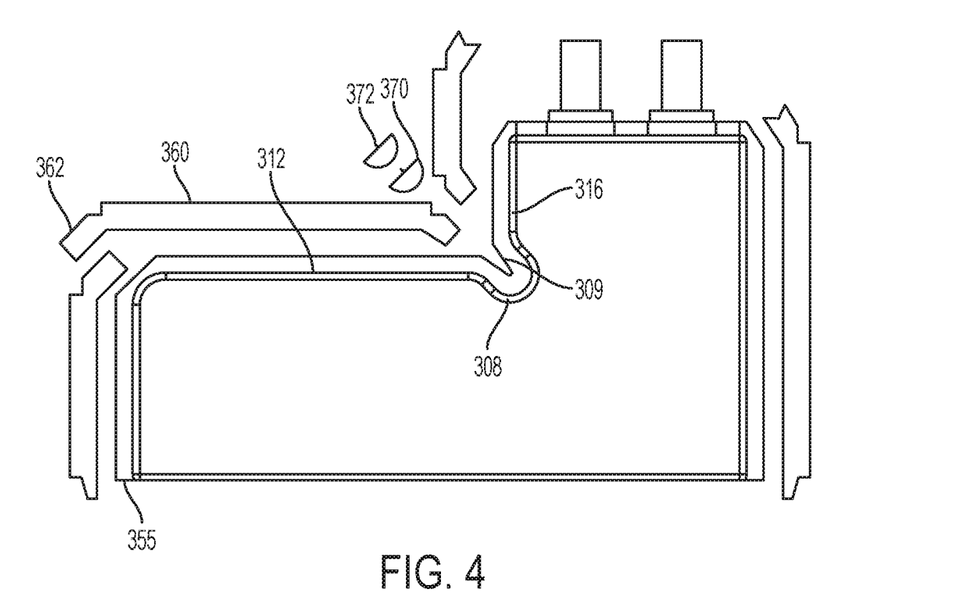
FIG. 4 shows a schematic top plan view of a battery according to some embodiments of the present technology.

After battery cell 305 has been sealed within pouch 350, method 200 may include taping seal 355 in operation 210. FIG. 4 shows a schematic top plan view of battery 300 according to some embodiments of the present technology with associated sections of tape 360 to be used about seal 355. Although sections of tape may extend about multiple sides of the battery cell seal in some embodiments, by utilizing separate pieces of tape along each side of the plurality of sides of the battery cell seal, each section of seal 355 may have improved coverage, and superior adhesion.

As noted previously, the exterior corners of the battery cell seal may include chamfered edges as illustrated. Additionally, one or more sections of tape 360, including each section of the tape, may include an extension 362, which may be characterized by an angle from the main body portion of each section of tape. A notch may be formed in the corner of the tape proximate the extension to accommodate the angle, which may be similar to or equivalent the chamfer angle of the seal 355. As illustrated, the sections of tape configured to be positioned along seal edges along longitudinal side 312 and lateral side 316 may include an extension on both ends of the tape. The first extension may accommodate a chamfered edge at an exterior corner of the seal, and the second extension may accommodate the interior corner 308.

As illustrated in FIG. 4, a notch 309 may be formed in seal 355 extending into the interior corner 308. Notch 309 may produce two sides of the notch, which may each be formed to receive the second extension of the associated sections of tape. Similar to the chamfered edges, the tape extensions configured to be positioned along the notch sides may be at an angle similar to or equivalent the angle of the sides of the notch.

Additional sections of tape may be specifically formed to be seated within the interior corner 308. As illustrated, corner tape pieces 370 may be shaped to accommodate the shape of interior corner 308, and may be characterized by a shape profile directly matching a profile of the interior corner. For example, as previously explained, interior corner 308 may be characterized by an arcuate shape. Accordingly, corner tape pieces 370 may be characterized by a portion of the tape having a specific semicircular profile to fit within the arcuate shape of the corner. Because the interior corner may limit folding operations, a first corner tape piece may be configured to be positioned in the interior corner on a first side of the seal, and a second corner tape piece may be configured to be positioned in the interior corner on a second side of the seal opposite the first. In some embodiments the corner tape pieces 370 may also include a leg 372 extending from an edge of the tape piece opposite an edge adjacent the interior corner. For example, leg 372 may extend outward from the interior corner a similar distance from each of side 312 and side 316, for example. This may further accommodate additional sealing at the interior corner 308.

Figure 5:
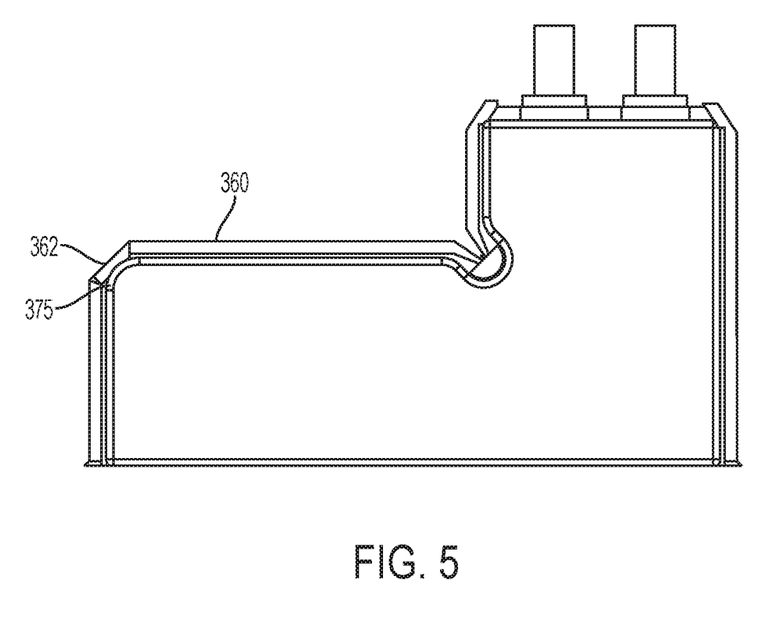
FIG. 5 shows a schematic top plan view of a battery according to some embodiments of the present technology.

FIG. 5 shows a schematic top plan view of battery 300 according to some embodiments of the present technology during the taping operation. As illustrated, the sections of tape 360 may be positioned on a surface of the seal, such as a first surface. Each piece of tape may then be folded over an exterior edge of the seal 355, such as an exposed edge. The tape may be folded over the exposed edges along each side of the battery cell as illustrated, and extensions 362 may be folded over the chamfered corners. As noted above, the corners may not readily fold in later operations, and the chamfered seal edge about exterior corner 375 may be more likely to be contacted by external components in some embodiments, as this corner may be more exposed than other edges, which may extend along a device housing, for example. By including the extensions on each section of tape 360, that accommodate exterior corner 375, double coverage may be provided at this corner from the overlapping extensions, and may be provided from each side of the edge. This may improve the ability of the corner to absorb contact events, as well as further protect the corner from exposure of an internal metal layer, for example.

At interior corner 308, the second tape extensions may secure about the sides of notch 309, although this may not fully cover the interior corner. Accordingly, in some embodiments, the legs 372 of corner tape pieces 370 may be directly coupled together at an outer edge region of the legs, distal from the semicircular portion. The legs may extend beyond the edge of the seal a minimum distance to limit the extension, while ensuring that the legs may fully couple together at the edge. In some embodiments, legs 372 may also contact at least a portion of the tape pieces extending over the notch sides. Hence, the interior corner 308 of the seal may be fully covered by tape 360 with the two extensions of the side lengths of tape and the corner tape pieces covering the notches and corner respectively.

Figure 6:
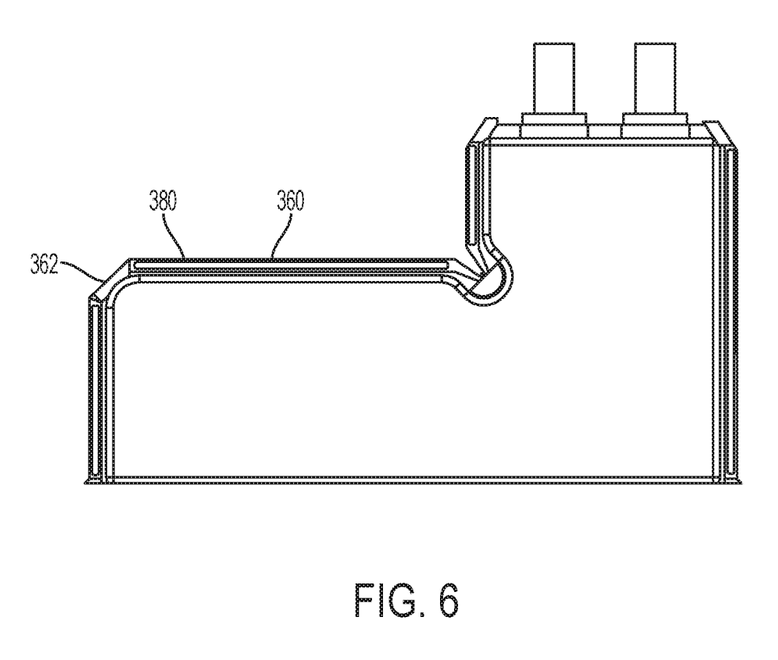
FIG. 6 shows a schematic top plan view of a battery according to some embodiments of the present technology.

After the tape has been folded about the seal to cover the outer edge of the seal, and any exposed internal pouch layers, the seal may be folded up against the pouch covering the battery cell. This may further protect the seal from contact events that could dislodge the tape, and may also reduce the exterior footprint of the battery cell. To maintain the seal in a folded position, an adhesive may be applied to the tape at operation 215 of method 200. FIG. 6 shows a schematic top plan view of battery 300 according to some embodiments of the present technology. As illustrated, adhesive 380 may be disposed on the tape 360 proximate an exterior edge of the seal where the tape may be folded over. The adhesive may be provided to limit flow of the adhesive, and ensure coverage is maintained along the edge of the tape, which may extend over the seal only a few millimeters or less in some embodiments. Hence, the adhesive may be applied as a thin line as illustrated, as beaded dots, or in any other manner to ensure position and control of the adhesive. In some embodiments the adhesive may be extended about the cell on the tape, although in some embodiments as illustrated, adhesive 380 may be applied along lengths of the tape body. Coverage may not extend on some or any of the extensions 362 as illustrated. As noted above, the corners may not readily fold, or may not fully adhere as corners of the battery may be characterized by rounded surfaces, which may not adequately facilitate coupling. Accordingly, adhesive may be reserved from the extensions 362 in some embodiments.

Figure 7:
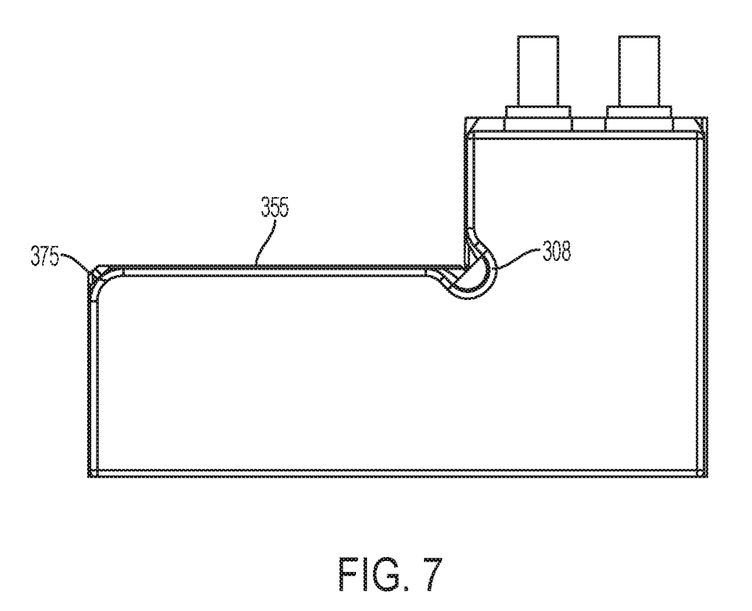
FIG. 7 shows a schematic top plan view of a battery according to some embodiments of the present technology.

When the adhesive has been applied to the tape, seal 355 may be folded up against the body of the battery cell in operation 220 of method 200. FIG. 7 shows a schematic top plan view of battery 300 according to some embodiments of the present technology. As illustrated, along each side of the battery where adhesive was applied, the seal 355 may be folded against the pouch 350 and coupled with the pouch along multiple sides of the battery cell. The adhesive may couple the tape with a side of the pouch in contact with the battery cell. This may reduce the outer dimensions of the battery cell, and limit the outer dimensions external to the battery cell. Additionally, FIG. 7 illustrates where interior corner 308 and exterior corner 375 may not include folded regions of the seal, where corner 375 shows limited folding where the fold along the sidewalls returns in orientation. Interior corner 308 may be recessed, and thus the extension of the seal may minimally impact the cell dimensions, and may substantially or essentially maintain the dimensions within what forms with the seal material a right corner at the interior corner. Although the dimensions may extend slightly at exterior corner 375, this may be limited by the chamfer applied along the corner to limit the seal length to be substantially or essentially within a right corner as may be defined from the folded seal material along the lengths leading to exterior corner 375.

Figure 8:
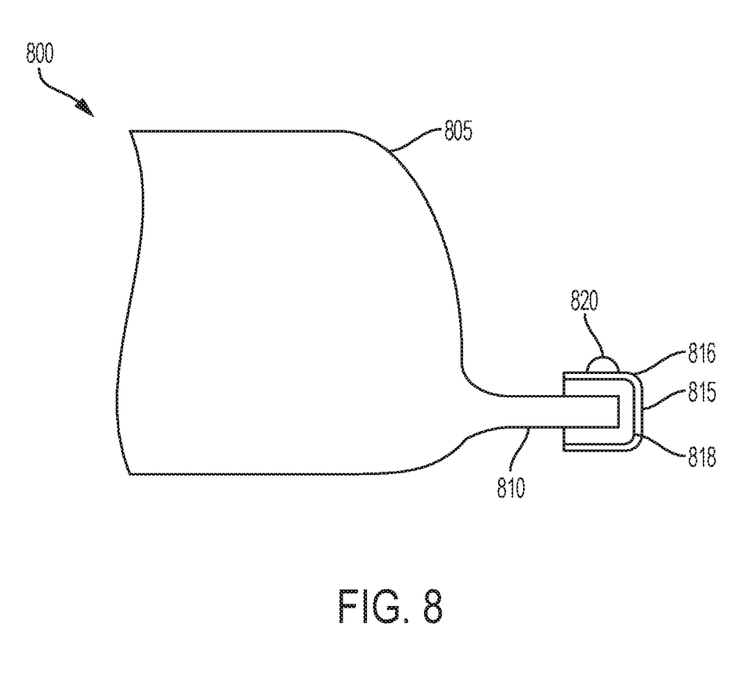
FIG. 8 shows a schematic cross-sectional view of a battery according to some embodiments of the present technology.

FIG. 8 shows a schematic cross-sectional view of a battery 800 according to some embodiments of the present technology. The figure may illustrate a cross-section through the cell to the seal, and may illustrate a battery cell 805 as enclosed within a pouch, as well as a seal region 810 of the pouch. The seal region 810 may include tape 815 as well as adhesive 820 as previously described, and may be or include any of the materials or components previously described. As illustrated in this figure, tape 815 may include both a material layer 816, and an adhesive layer 818. As explained above, the present technology may be used with batteries of smaller form factors, or cells which may have strict dimensional requirements within an electronic device. By limiting space consumed by packaging, additional space within the form factor may be used to increase the battery cell dimensions.

To further accommodate the space, tape may be used that limits its addition to the form factor. For example, the tape sections may have a limited thickness, but to ensure adequate adhesion about the seal, more than 25% of the thickness may be the adhesive layer 818. Additionally, the adhesive layer may be more than or about 30% of the thickness of the tape 815, and may be more than or about 40%, more than or about 50%, more than or about 60%, more than or about 70%, more than or about 80%, or more. Any number of adhesives and tapes may be used, but the characteristics of the material layer may be to limit puncturing of the adhesive both from within and externally, and the adhesive may be configured to maintain adhesion against the pouch material even at limited dimensions, including less than or about 5 mm across the seal. In some embodiments as illustrated, the tape material may not fully extend across the seal, and may be maintained on the seal. For example, the adhesive layer 818 of the tape 815 may be maintained in contact with the seal of the pouch, and may not extend to a portion of the pouch in contact with the battery cell. This may limit the final thickness when the seal is folded up along the pouch. It is to be understood that FIG. 8 is merely a schematic, and may not be to scale, for example, tape 815 may be a thickness less than the thickness of the seal, and may be less than half the thickness in some embodiments, or less.

Figure 9:
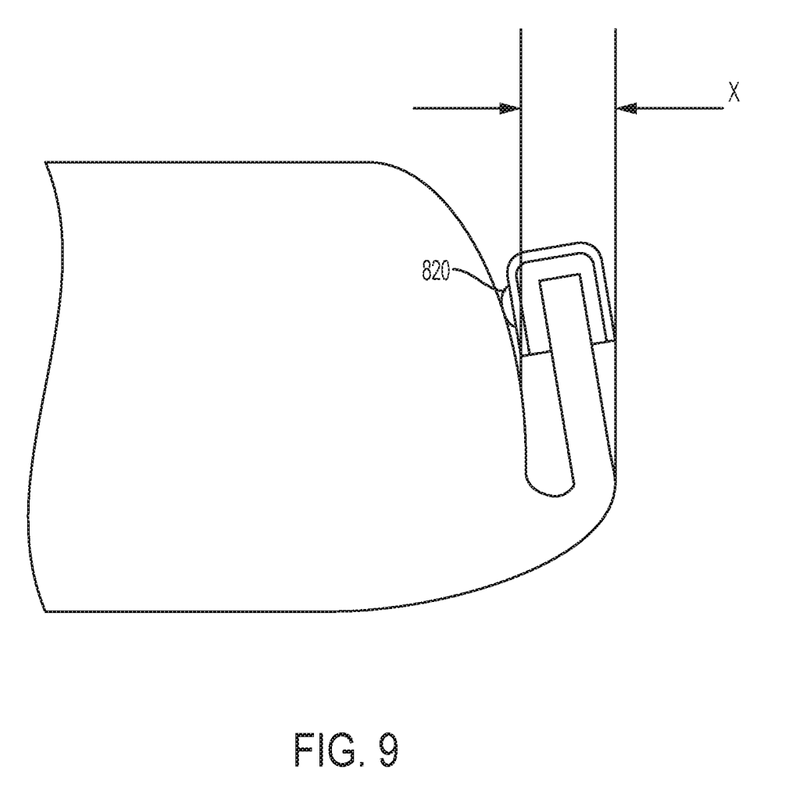
FIG. 9 shows a schematic cross-sectional view of a battery according to some embodiments of the present technology.

Adhesive 820 may be positioned on the material layer of the tape 815 in embodiments as explained above. The adhesive may be any number of adhesives capable of maintaining the tape coupled with the pouch to maintain the seal in a folded position. FIG. 9 shows a schematic cross-sectional view of battery 800 according to some embodiments of the present technology. As shown, in the folded position adhesive 820 couples a material side of the tape with the pouch where the seal is folded against the pouch. By utilizing a single fold according to the present technology, the external thickness of the battery beyond the battery cell may be limited, and may be reduced from double-fold designs.

For example, distance X as illustrated may be the external distance of the battery beyond the pouch in contact with the battery cell. In some embodiments, the thickness may be less than 90% of the thickness of a double-fold design, and may be less than or about 80% of the thickness, less than or about 70% of the thickness, less than or about 60% of the thickness, less than or about 50% of the thickness, less than or about 40% of the thickness, or less. Additionally, the thickness may be determined based on the seal thickness, and may be less than or about ten times the seal thickness, and in embodiments may be less than or about nine times the seal thickness, less than or about eight times the seal thickness, less than or about seven times the seal thickness, less than or about six times the seal thickness, less than or about five times the seal thickness, less than or about four times the seal thickness, less than or about three times the seal thickness, less than or about twice the seal thickness, less than or about one and a half times the seal thickness, substantially or essentially equal to the seal thickness, or less.

In terms of dimensions, the seal in the coupled position may extend less than or about 1 cm from an outer edge of the battery cell or pouch in contact with the battery cell, depending on cell thickness, and may extend less than or about 9 mm from an outer edge of the battery cell or pouch, less than or about 8 mm from an outer edge of the battery cell or pouch, less than or about 7 mm from an outer edge of the battery cell or pouch, less than or about 6 mm from an outer edge of the battery cell or pouch, less than or about 5 mm from an outer edge of the battery cell or pouch, less than or about 4 mm from an outer edge of the battery cell or pouch, less than or about 3 mm from an outer edge of the battery cell or pouch, less than or about 2 mm from an outer edge of the battery cell or pouch, less than or about 1 mm from an outer edge of the battery cell or pouch, less than or about 0.5 mm from an outer edge of the battery cell or pouch, or less. This may allow the additional volume within the space to be consumed by the battery cell itself, which may allow an increase in the size of the battery cell components along each side of the cell to the distance gained by utilizing the single-fold configuration according to embodiments of the present technology. Additionally, by utilizing methods and configurations according to some embodiments of the present technology, interior corners of battery cells, such as non-standard or non-rectangular battery cells, may be better protected along a seal region.

Figure 10:
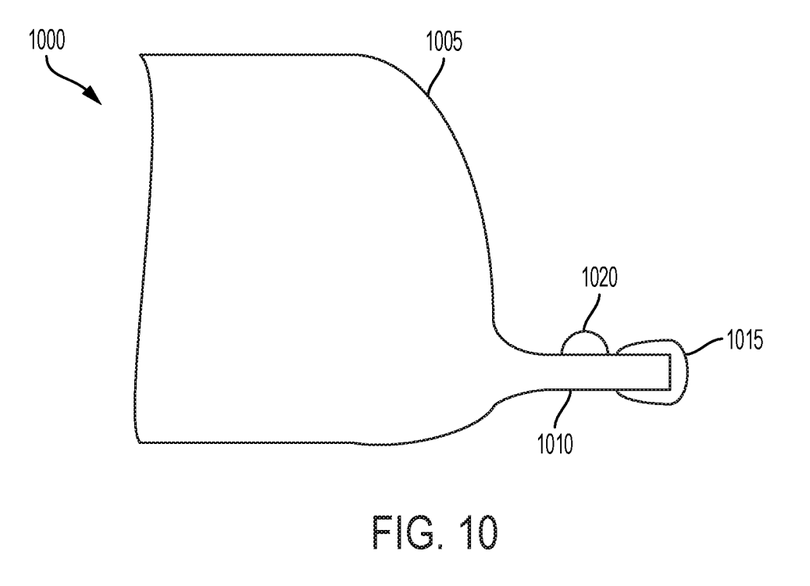
FIG. 10 shows a schematic cross-sectional view of a battery according to some embodiments of the present technology.

FIG. 10 shows a schematic cross-sectional view of a battery 1000 according to some embodiments of the present technology, and may include aspects of any of the previously discussed cells including battery 800. Similar to FIG. 8, the figure may illustrate a cross-section through the cell to the seal, and may illustrate a battery cell 1005 as enclosed within a pouch, as well as a seal region 1010 of the pouch. The seal region 1010 may include a glue 1015 as well as adhesive 1020 similar to adhesives as previously described, and may be or include any of the materials or components previously described. Glue 1015 may be used to form a seal about similar edges of the battery cell as the tape described previously. Glue 1015 may be applied to form a continuous seal along any edge or edges, and may not include overlapping materials, as the glue may be provided in a single bead application in some embodiments. For example, a curable glue may be applied about a distal edge of the seal region 1010, to provide coverage across the two layers. Similar to the tape embodiments, the present technology may be used with batteries of smaller form factors, and the glue used may provide a seal against what may be otherwise sharp edges as previously described.

Figure 11:
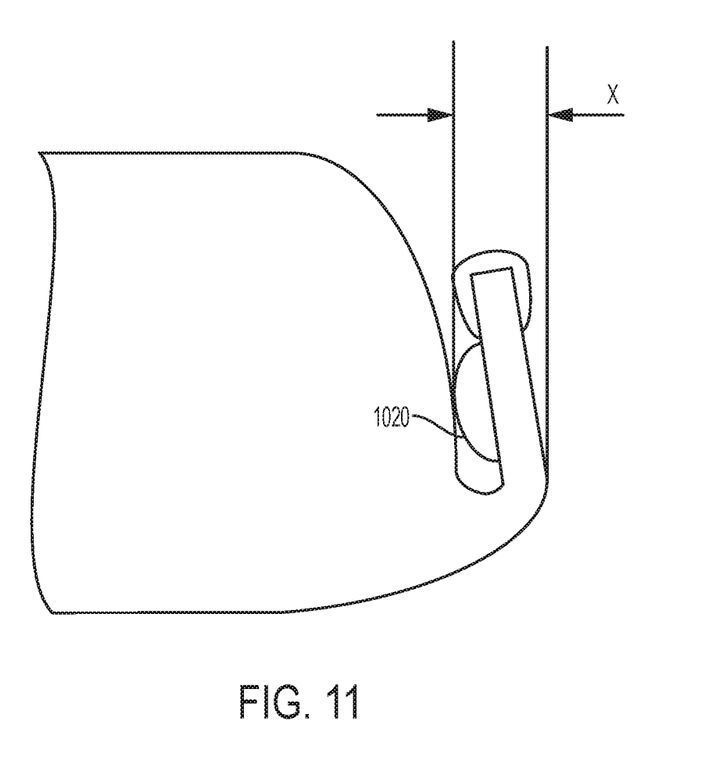
FIG. 11 shows a schematic cross-sectional view of a battery according to some embodiments of the present technology.

The glue used may be a number of glues that may be dried or cured to form a seal along one or more edges of the battery cell. For example, a liquid glue may be used that may include one or more of a silicon glue, a polymeric material such as polyurethane, an epoxy, or other materials that may be dried or cured by one or more of heat, air exposure, or UV exposure, for example. Once cured, glue 1015 may provide a flexible bond about the edge of the battery cell, which may protect additional surrounding components. By using a glue, the thickness of the seal may be limited to any of the dimensions discussed previously. The glue may be applied with less handling than tape in some embodiments, which may facilitate further reduced dimensions of the seal. For example, the glue may be characterized by a thickness from the seal region 1010 of less than or about 1 mm, and may be less than or about 500 µm, less than or about 400 µm, less than or about 300 µm, less than or about 200 µm, less than or about 150 µm, less than or about 100 µm, less than or about 80 µm, less than or about 50 µm, Adhesive 1020 may be positioned on the seal region 1010 in embodiments, and may or may not contact or overlap the glue provided about the seal. The adhesive may be any number of adhesives capable of maintaining the seal in a folded position as previously described. FIG. 11 shows a schematic cross-sectional view of battery 1000 according to some embodiments of the present technology. As shown, in the folded position adhesive 1020 couples the seal region 1010 with the pouch where the seal is folded against the pouch. Because glue 1015 may have reduced thicknesses, the external thickness of the battery beyond the battery cell may be limited, and may be reduced from double-fold designs and other sealed designs to a distance X of any of the thicknesses previously noted, which may accommodate an extension distance of any of the previously noted dimensions.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery comprising:
   a battery cell comprising a longitudinal body section and a lateral body section extending from and normal to the longitudinal body section, wherein an intersection of the longitudinal body section and the lateral body section defines an interior corner;
   a pouch extending about the battery cell, wherein the pouch defines a seal where a first section of the pouch is sealed to a second section of the pouch externally to the battery cell about a plurality of sides of the battery cell including at the interior corner, and wherein the seal is folded against the pouch and coupled with the pouch along multiple sides of the battery cell; and
   tape disposed along and folded over an exterior edge of the seal along each side of the plurality of sides of the battery cell along which the seal is formed, wherein the tape comprises a separate piece of tape for each side of the plurality of sides of the battery cell along which the seal is formed, wherein a first corner tape piece is positioned on one side of the seal at the interior corner, and wherein a second corner tape piece is positioned on an opposite side of the seal as the first corner tape piece.

2. The battery of claim 1, further comprising electrode tabs extending from an edge of the lateral body section of the battery cell, wherein the electrode tabs extend through the pouch.

3. The battery of claim 1, wherein the battery cell defines the interior corner as an arcuate shape recessed from a planar intersection of a sidewall of the lateral body section and a sidewall of the longitudinal body section.

4. The battery of claim 1, wherein the pouch is folded about the battery cell along a longitudinal side of the battery cell, and wherein the pouch is sealed along the remaining sides of the battery cell.

5. The battery of claim 1, further comprising tape disposed along and folded over an exterior edge of the seal along each side of the plurality of sides of the battery cell along which the seal is formed.

6. The battery of claim 5, wherein the tape comprises a separate piece of tape for each side of the plurality of sides of the battery cell along which the seal is formed.

7. The battery of claim 6, wherein each outer corner of the seal comprises a chamfered edge, and wherein each piece of tape includes an extension coupled along an adjacent chamfered edge.

8. The battery of claim 6, wherein at the interior corner a notch is defined in the seal, and wherein each piece of tape extending along the seal towards the interior corner includes an extension that couples about a side of the notch.

9. The battery of claim 1, wherein each of the first corner tape piece and the second corner tape piece are characterized by a shape profile matching a profile of the interior corner, and wherein each of the first corner tape piece and the second corner tape piece include a leg extending from an edge of the tape piece opposite an edge adjacent the interior corner.

10. The battery of claim 9, wherein the leg of the first corner tape piece is at least partially coupled directly to the leg of the second corner tape piece.

11. The battery of claim 5, wherein an adhesive is positioned on the tape proximate an exterior edge of the seal, and wherein the adhesive couples a material side of the tape with the pouch where the seal is folded against the pouch.

12. The battery of claim 5, wherein the tape comprises a material layer and an adhesive layer, and wherein the adhesive layer of the tape is maintained in contact with the seal of the pouch without extending to a portion of the pouch in contact with the battery cell.

13. A battery comprising:
a battery cell characterized by an L-shaped body defining an interior corner; and
a pouch folded about the battery cell along a length of the battery cell, wherein the pouch defines a seal where a first section of the pouch is sealed to a second section of the pouch externally to the battery cell about each side of the battery cell but the length along which the pouch is folded;
tape positioned along a first surface of the seal and extending about an outer edge of the seal to a second surface of the seal opposite the first surface, wherein a first corner tape piece is positioned on one side of the seal at the interior corner, and wherein a second corner tape piece is positioned on an opposite side of the seal as the first corner tape piece; and
adhesive disposed on an exterior surface of the tape along a portion of the tape positioned on the second surface of the seal, wherein the adhesive couples the tape and seal with a section of the pouch contacting the battery cell.

14. The battery of claim 13, wherein the seal in the coupled position with the pouch extends less than 1 mm from an outer edge of the battery cell.

15. The battery of claim 13, wherein at the interior corner a notch is defined in the seal, and wherein the tape comprises an angled extension that is positioned on the seal along a side of the notch.

16. The battery of claim 13, wherein the battery cell defines the interior corner as an arcuate shape recessed from a planar intersection of perpendicular sidewalls of the L-shaped body at the interior corner, and wherein the first corner tape piece and the second corner tape piece are each characterized by a semicircle section of tape disposed on the seal at the interior corner.

17. The battery of claim 16, wherein the first corner tape piece and the second corner tape piece further comprise a leg extending from the semicircle section of tape, and wherein the leg of the first corner tape piece is at least partially coupled directly to the leg of the second corner tape piece.

18. A battery comprising:
a battery cell comprising a longitudinal body section and a lateral body section extending from and normal to the longitudinal body section, wherein an intersection of the longitudinal body section and the lateral body section defines an interior corner, and wherein the battery cell defines the interior corner as an arcuate shape recessed from a planar intersection of a sidewall of the lateral body section and a sidewall of the longitudinal body section;
a pouch extending about the battery cell, wherein the pouch defines a seal where a first section of the pouch is sealed to a second section of the pouch externally to the battery cell about a plurality of sides of the battery cell including at the interior corner, and wherein the seal is folded against the pouch and coupled with the pouch along multiple sides of the battery cell; and
tape disposed along and folded over an exterior edge of the seal along each side of the plurality of sides of the battery cell along which the seal is formed, wherein the tape comprises a material layer and an adhesive layer, and wherein the adhesive layer of the tape is maintained in contact with the seal of the pouch without extending to a portion of the pouch in contact with the battery cell.

\* \* \* \* \*